(12) United States Patent  (10) Patent No.: US 8,792,768 B2
Gilge  (45) Date of Patent: Jul. 29, 2014

(54) METHOD FOR RECORDING VIDEO/AUDIO DATA IN A NETWORK

(75) Inventor: Michael Gilge, Nuremberg (DE)

(73) Assignee: Robert Bosch GmbH, Stuttgart (DE)

( * ) Notice: Subject to any disclaimer, the term of this patent is extended or adjusted under 35 U.S.C. 154(b) by 1567 days.

(21) Appl. No.: 10/541,283

(22) PCT Filed: Jan. 10, 2004

(86) PCT No.: PCT/EP2004/000115
§ 371 (c)(1),
(2), (4) Date: Apr. 3, 2006

(87) PCT Pub. No.: WO2004/064400
PCT Pub. Date: Jul. 29, 2004

(65) Prior Publication Data
US 2006/0204207 A1  Sep. 14, 2006

(30) Foreign Application Priority Data

Jan. 10, 2003  (DE) ................................ 103 014 551

(51) Int. Cl.
*H04N 5/932* (2006.01)
(52) U.S. Cl.
USPC .......................................... 386/210; 386/200
(58) Field of Classification Search
USPC ................ 348/143–161, 207.1, 211.1–211.3, 348/231.9; 386/1, 46, 68, 95, 124–126
See application file for complete search history.

(56) References Cited

U.S. PATENT DOCUMENTS

| 5,724,475 A * | 3/1998 | Kirsten ......................... 386/109 |
| 6,393,470 B1 | 5/2002 | Zadrozny et al. |
| 6,741,977 B1 * | 5/2004 | Nagaya et al. ..................... 707/1 |
| 6,857,056 B2 | 2/2005 | Baumeister et al. |
| 6,954,859 B1 * | 10/2005 | Simerly et al. ..................... 726/3 |
| 7,386,872 B2 * | 6/2008 | Shimizu ......................... 725/105 |
| 2002/0003575 A1 * | 1/2002 | Marchese ..................... 348/231 |

FOREIGN PATENT DOCUMENTS

| DE | 101 46 821 | 5/2003 |
| EP | 1 198 097 | 4/2002 |
| WO | WO 01/27763 | 4/2001 |
| WO | WO 01/45388 | 6/2001 |
| WO | WO 03/036936 | 5/2003 |

OTHER PUBLICATIONS

Mobotix AG: "Network-CCVT & WebCam Part 1: Introduction," Mobotix-Concept, May 2002, pp. 2-6, p. 12, pp. 16-19.
Oakley, M. "Introduction to TCP//IP", Proceedings of Share Europe Spring Conference, XP000562101,Apr. 18, 1994, pp. 481-507.

* cited by examiner

*Primary Examiner* — William C Vaughn, Jr.
*Assistant Examiner* — Eileen Adams
(74) *Attorney, Agent, or Firm* — Kenyon & Kenyon LLP

(57) ABSTRACT

A method for recording video/audio data generated by a capturing device including a data memory provides connecting the data memory of the capturing device to at least one recording device that is provided with a greater storage capacity than the data memory of the capturing device, and exchanging data between the data memory and the at least one recording device such that a virtual data memory is created for the capturing device by means of the recording device.

36 Claims, 5 Drawing Sheets

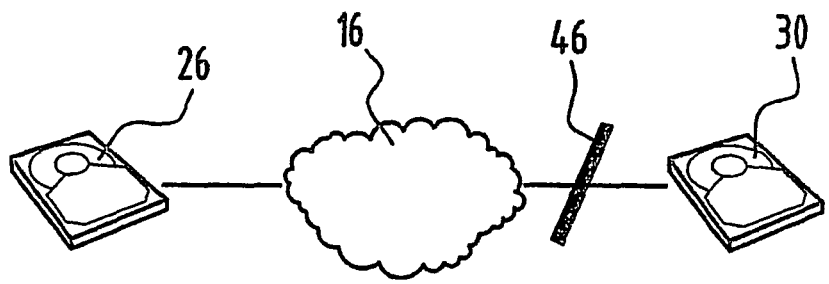
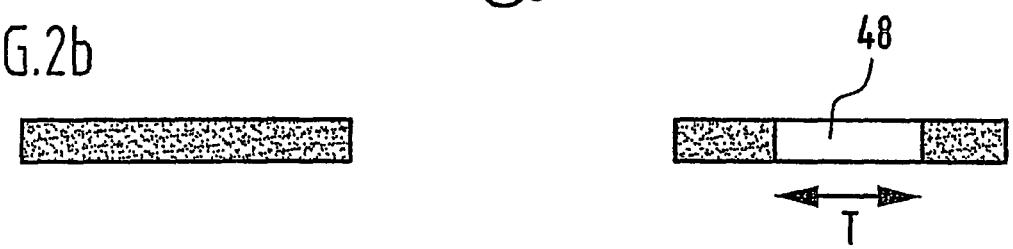
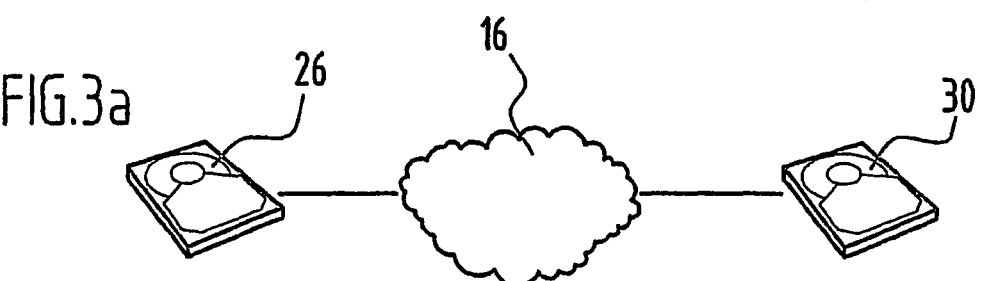

METHOD FOR RECORDING VIDEO/AUDIO DATA IN A NETWORK

FIELD OF THE INVENTION

The present invention relates to a method for recording video/audio data in which the data are generated by a capturing device having a data memory.

BACKGROUND INFORMATION

Video data and/or audio data are generated within the scope of the so-called NVR concept (NVR—network video recording) at a video source of the capturing device, such as a digital camera or an analog camera that is coupled to a video server, and the digital data are then transmitted via a digital network to a recording device which includes an appropriate data memory.

An object of the present invention is improving a method for recording video/audio data in such a way that the method may be used in a simple manner.

SUMMARY

The method of the present invention provides that the data memory of the capturing device is connected to at least one recording device that has a greater storage capacity than the data memory of the capturing device, and that data are exchanged between the data memory and at least one recording device, so that a virtual data memory is formed for the capturing device, using the recording device.

The recording device includes a data memory having a sufficiently large memory capacity which appears to be "infinite", particularly to the capturing device. The data are filed in the recording device, and a data evaluation is carried out based on the filed data. Hard disks are usually used for the data storage. In accordance with the present invention, data may be stored temporarily in a data memory having a relative low capacity, and after being read out, may be transmitted to the network, the very much higher memory capacity in the recording device then being the effective memory capacity for the capturing device.

According to the present invention, a virtual data memory is made available for the recording device, the physical memory capacity of the data memory of the capturing device being substantially smaller than the effective memory capacity.

In this context, the recording device with its data memory acts as a central recording unit, which may be utilized in common by a plurality of independent capturing devices. The capturing device may be connected directly to the recording device(s) or, for example, may be interconnected to a digital network via which the data may be transmitted.

In a case where the data of a capturing device are to be accessed also at the capturing device, one may then access both the data which are physically present in the data memory of the capturing device and the data of the recording device. Because of the development of a virtual memory, a user does not, however, have to carry out any different access, i.e., he does not have to differentiate as to whether the data are physically present in the data memory of the capturing device or whether they are physically present in the data memory of the recording device, that is, whether the data were transferred to external storage.

In particular, the data memory of the capturing device is a local data memory, which is provided for the purpose of temporarily storing data before they are transmitted.

The at least one recording device forms a central data memory that has a high storage capacity, and which may be used in common with a plurality of capturing devices, in order to effectively increase the memory capacity by forming a virtual data memory.

A system is made available that may be implemented cost-effectively. It may be used flexibly and in an error-tolerant manner.

It may be provided that the capturing device and/or the at least one recording device are interconnected to a digital network. In that case, data may be transmitted via this digital network, and, in particular, data may be exchanged between the data memory of the capturing device and the central recording device via the digital network.

It is favorable if the reading out of data from the data memory at the capturing device for transmission to the at least one recording device is logically coupled to the input of new data into the data memory. Thereby, one may achieve that the data memory at the capturing device does not overflow, but that data are transferred to an external storage in time.

In this context, the input data are more current in time than the data that are read out. The system then works on a first in-first out principle, the older data being just kept in reserve in the data memory in the sense of a buffer storage.

It is advantageous if the data from the data memory are copied for transmission, for example, to a digital network. The data are then read out, in order that they may be transmitted. Because of this copying of the data, at an effectively high storage capacity (determined by the memory capacity of the recording device, which receives the data), the memory capacity at the capturing device may be kept low, in order, for example, to keep usage of space of the capturing device and current usage low. Because of the data storage at the capturing device, i.e., at the data source for the video data and/or the audio data, in this context, even during interference in the data transmission, data that come up may be temporarily stored, in order to not generate any lasting data gaps in the recording at the recording device.

In particular, the transmitted data are received by a recording device that records the data received in order, for example, to store them and/or to perform an evaluation based on the recorded data. Such a data evaluation is described in connection with an access control system in the published German Patent Application Number 10146 821.0 by the present applicant.

In one variant of an exemplary embodiment, it is provided that data are input into the data memory at the same rate as that used for reading out data from the data memory. In this context, in particular, the data are continuously read out from the data memory.

It may also be provided that data from the data memory are read out at time intervals, i.e., in time packets.

In this connection, it is then advantageous if data from the data memory are read out at a higher rate than that at which new data are input into the data memory, in order to avoid large changes in the filling up of the memory.

In this context, the reading out of data may take place when a certain threshold is reached, the threshold being determined, for example, with respect to the memory capacity. If, for example, a threshold of 50% of the memory capacity of the data memory is exceeded, this may be used as an initiation signal to effect the reading out of data for transmission to the digital network.

It is favorable if data are stored in the data memory in order to make available a buffer function for the data transmission to the digital network. In that case, temporary interferences in data transmission to the digital network may be bridged without loss of data, since the data are, after all, stored at the capturing device and thereby the data coming in during the interference time are not lost.

In order to be able to develop the data memory so as to have a relatively low memory capacity, it is advantageous if data are deleted from the data memory after their successful transmission.

In this connection, it is then advantageous if a recording device, which receives transmitted data, checks these data for intactness, and notifies the recording device of the capturing device of the intactness of data. Based on the appropriate notification, the corresponding storage area of the data memory may then be deleted.

It may then be provided that the at least one recording device has different storage areas which correspond to different recording durations. It is thereby possible, for example, to store data volumes allocated to different capturing devices. For instance, a capturing unit such as a camera has to monitor an area in which data have to be recorded over several days, that is, have to be stored, while another camera only has to record data that covers few hours. By allocating different storage areas, variations in recording durations may be taken into consideration.

Thereby it becomes possible to store large data volumes, at the same time, a certain data volume being held "in situ" as security against failures, e.g., of the digital network.

In particular, the different storage areas are allocated to different capturing devices or to different capturing units of a capturing device. Because of that, different recording times (that is, data volumes that have come about in different time intervals, and which may, in part, also overlap) may be recorded.

In particular, the different storage areas are allocated to different recording lengths in time. Thereby, depending on requirements, different recording times may be implemented. In this context, it is favorable if the recording time for a certain capturing unit, such as a camera, is adjustable, and independent of the storage space on the capturing device. The recording duration, i.e., for the time duration in which data have to be captured and stored, is then not determined by the capacity of the capturing device or the capturing units, but at most by the capacity of the capturing device.

In particular, the data memory of the capturing device may have a capacity corresponding to a temporal duration of the data accrual, so that a certain data volume is able to be stored in situ on the capturing device. This provides security with respect to failures in the transmission of data in the digital network.

When a time limit is exceeded, the data are then transmitted to the recording device. This yields the possibility of storing large data volumes.

The present invention also provides a capturing device for video/audio data which includes an interface for communications with at least one central recording device, via which data are able to be transmitted to the at least one recording device.

In this context, according to the present invention, a data memory and a control device for the data memory are provided, the input of new data into the data memory being interconnectible with the reading out of older data for transmission to the recording device, in order to form a virtual data memory using the recording device.

In particular, it is favorable if, via the control device, data from the data memory are able to be copied from the data memory for transmission. Thereby, it may be ensured that no data are lost even in the cases of interferences in the transmission. Furthermore, the storage capacity with respect to the capturing device may thereby be increased beyond the physical storage capacity, since, because of the data copying, a data memory of the recording device interconnected with the digital network "virtually" makes available its storage capacity to the capturing device.

In particular, data separated in time are able to be read out from the data memory for transmission, using the control device.

The present invention also provides a recording system for video/audio data which includes at least one capturing device and at least one recording device, whereby the data sent by the at least one capturing device are able to be stored.

BRIEF DESCRIPTION OF THE DRAWINGS

FIGS. 2a and 2b show schematic representations of the data recording during interferences in the network transmission.

FIGS. 3a to 3d show schematically the data transmission after the end of an interference in the network transmission.

DETAILED DESCRIPTION

Figure 1:
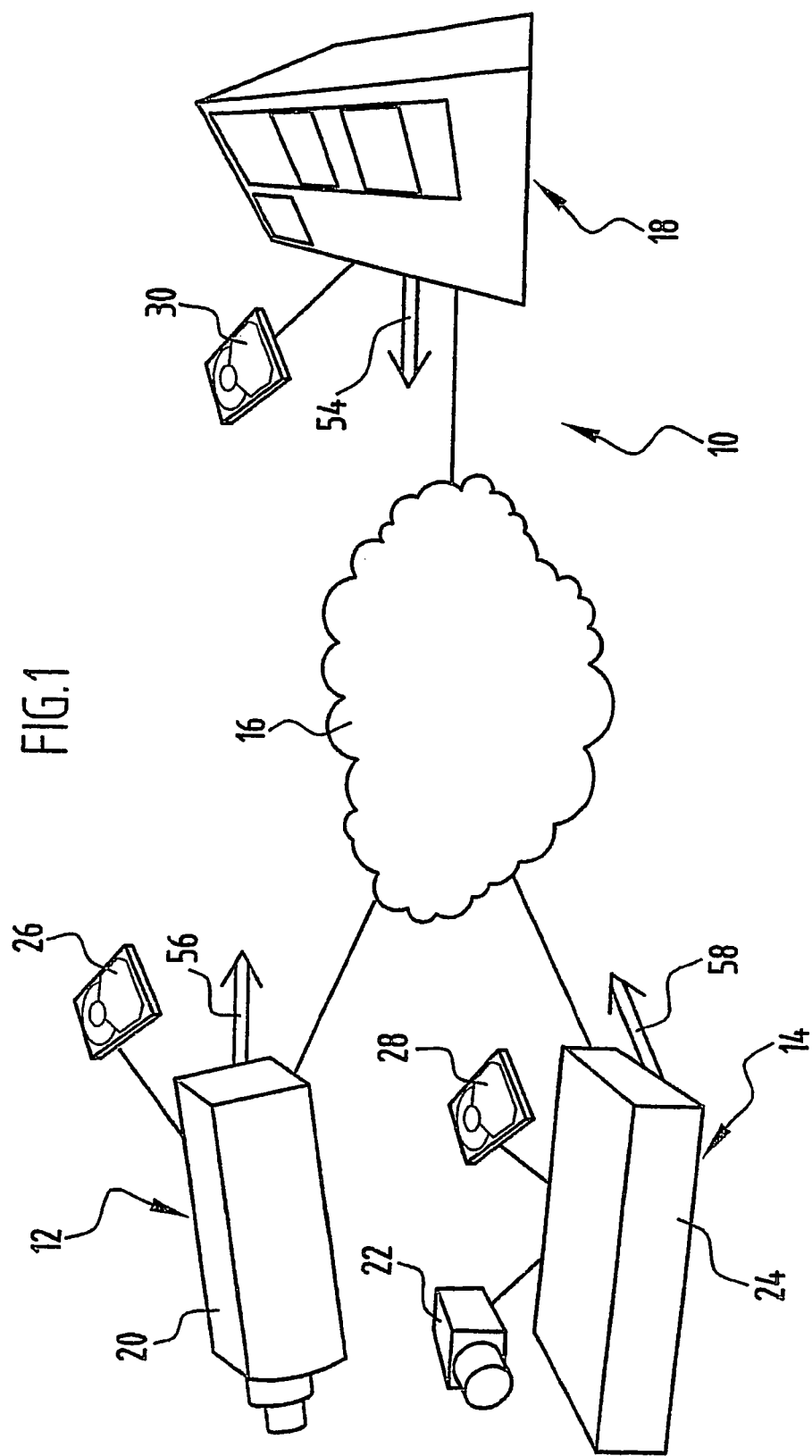
FIG. 1 shows a schematic representation of an NVR video/audio system.

A recording system for video/audio data according to the NVR principle (NVR—networked video recording), shown in FIG. 1 and designated as a whole by the number 10, includes capturing devices 12, 14, which make available video/audio data. In this context, these video data and/or audio data are generated in time sequence and made available as digital data or converted to digital data, and transmitted on a digital network 16 to a recording device 18 (e.g., network video recorder), which, in particular, permanently records the data supplied by capturing devices 12, 14, in order, for example, to be able to store them and evaluate them. Recording device 18 is used as a recording server.

Capturing devices 12, 14 include cameras and/or microphones. In this context, it may be provided that a capturing device (in FIG. 1 capturing device 12) includes a digital camera 20 and/or a digital microphone; in that case, digital video data and/or audio data are made available directly.

Alternatively or additionally, it may be provided that analog capturing units, such as an analog camera 22 and/or an analog microphone, are provided. Postconnected to these, there is, as an analog to digital converter, for instance, a video server 24, in order to be able to make available the corresponding digital data that are able to be transmitted on digital network 16.

Digital network 16 is a preexisting network that is independent of system 10. Capturing devices 12, 14 and recording device 18 then have appropriate communications interfaces 25 (FIG. 4) and 29 (FIG. 5), using which, these are respectively able to be interconnected with digital network 16, in order to be able to pass data to digital network 16, that is, to be able to transmit data over digital network 16, and in order to be able to receive data from digital network 16.

With respect to digital network 16, a public network may be involved, such as the Internet, an ISDN network, a GSM network or an UMTS network.

In addition to the above, a proprietary network may also be involved, which is formed over leased lines. An example for such a network is an intranet owned by a company. Digital network 16 may also be a local network (LAN—local area network) or a non-local network (WAN—wide area network).

The data are transmitted on digital network 16 according to a certain protocol, such as TCP/IP.

What is characteristic with video data and audio data is that there is a data sequence in time, that is, there is a data flow, the succession in time being of decisive importance for the evaluability and storage. The data are (inherently) provided with a timing mark, which characterizes their temporal categorization. The data captured in time sequence by capturing devices 12, 14 also have to be recorded in this sequence at recording device 18, in order to make ealuation possible. In NVR systems 10 there is the problem, in this context, that interferences in data transmission on digital network 16 may lead to gaps in the recording by recording device 18.

Now, according to the present invention, it is provided that the video data and/or the audio data delivered, for instance, by digital camera 20 of capturing device 12 and/or video server 24 of capturing device 14, are also recorded at the data source, in order, after an interference in the data transmission on digital network 16, to be able to make available data that were generated during the duration of the interference by digital camera 20 or analog camera 22.

For this, a respective data memory 26, 28 is allocated to capturing device 12, 14, by which the video data and/or audio data may be recorded independently of the recording at recording device 18, but specifically at the data source, before the data transmission.

Data memories 26, 28 may be volatile or nonvolatile memories. However, nonvolatile memories such as hard disk storage are generally used. Such data memories 26, 28 may, in this context, be integrated into the housing of digital camera 20, for instance, or of video server 24, or may be situated separately. But they are in each case components of the appertaining capturing device 12 or 14.

Recording device 18 also has one or more data memories 30, such as hard disk drives, the storage capacity of recording device 18 being substantially larger than the storage capacity of data memory 26 or 28 at the data source.

The data recording at capturing devices 12, 14, that is, at the data source, takes place independently of the data recording at recording device 18, that is, independently of the data receiver of the data transmitted over digital network 16 by capturing devices 12, 14.

Figure 4:
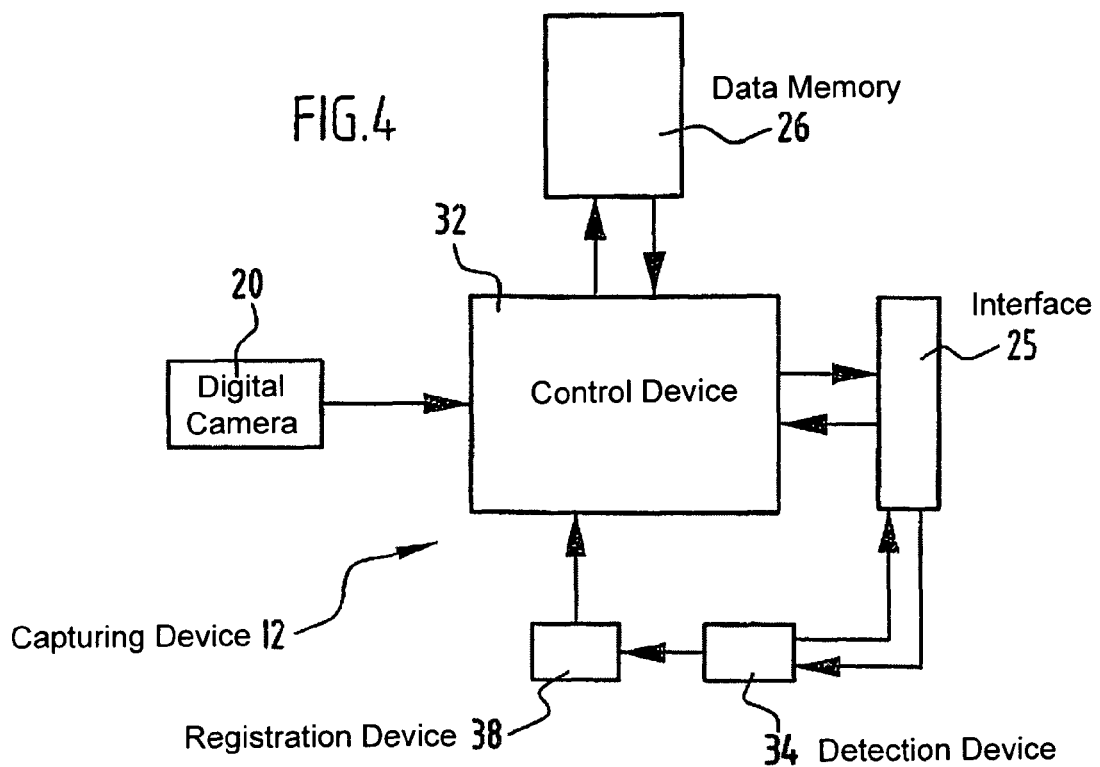
FIG. 4 shows a schematic representation of components of an exemplary embodiment of the capturing device according to the present invention.
Figure 5:
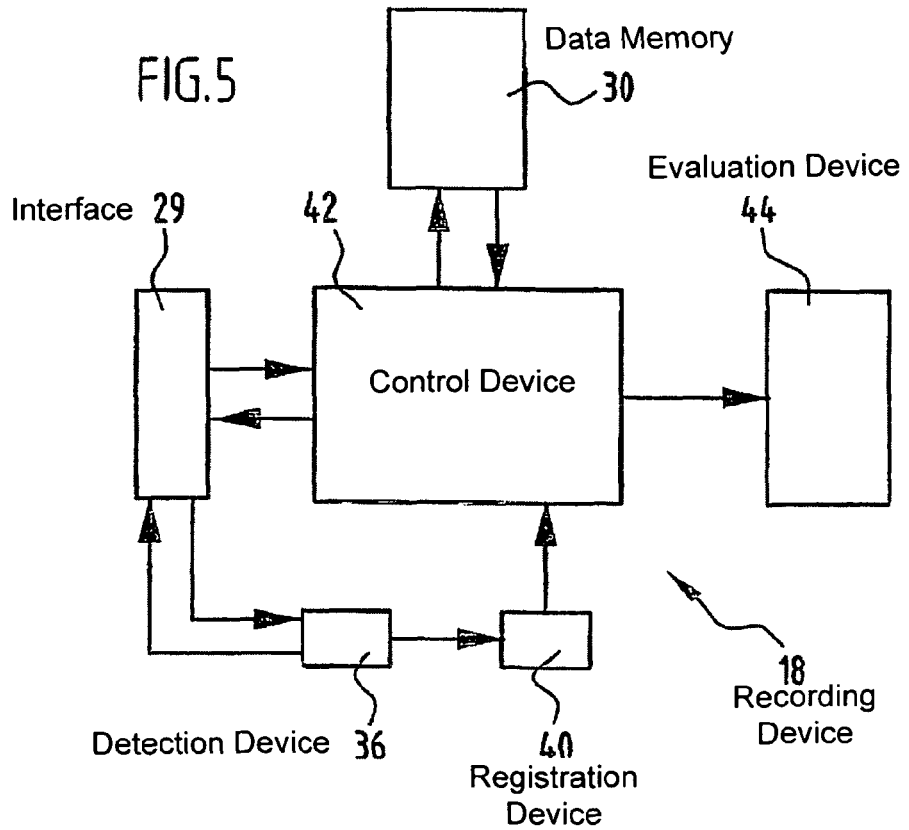
FIG. 5 shows a schematic representation of components of an exemplary embodiment of the recording device according to the present invention.

The capturing devices, such as capturing device 12, in each case include, as shown schematically in FIG. 4, a control device 32 which may be implemented as a hardware or a software, and which controls the data recording at data memory 26, that is, especially the input and readout of data, these data being supplied by digital camera 20.

Control device 32 is coupled to interface 25, in order to be able to send appropriate data onto digital network 16, and to be able to receive signals from digital network 16.

A detection device 34 is also provided, which is interconnected at interface 25, via which test signals (life check signals) are transmittable to digital network 16, and corresponding life check signals are able to be received from the digital network. These life check signals, which are, for instance, sent off at strictly set time intervals, are used for detecting interference in the data transmission on digital network 16. Such interferences are caused, for example, by network components such as switches, routers or the like having failed, or by components being connected to digital network 16 in a faulty manner or not at all, or caused by great network traffic making the data transmission rate on digital network 16 insufficient.

Capturing device 12, in this context, exchanges this life check signal with recording device 18, which also has a detection device 36 that is in contact with interface 29. Data transmission interferences on digital network 16 may be detected and registered by capturing device 12 and by recording device 18, by the exchange of life check signals between capturing device 12 (and possibly additional capturing devices 14, etc) and recording device 18.

For this, there is provided, respectively, a registration device 38 at capturing device 12 and a registration device 40 at recording device 18. These registration devices 38, 40 keep a log regarding data transmission interferences on digital network 16, especially with regard to the points in time of status changes in the interference. Thus the point in time of an interference is registered, as well as the duration of such an interference.

Using this, capturing device 12 may then generate data as to which video data and or audio data (corresponding to a certain time interval) were not, or not successfully, transmitted to recording device 18, that is, which part of the data flow was not transmitted, and recording device 18 is able to generate the data as to when in the recording there is a data gap based on interference in the data transmission. Registration devices 38 and 40, in this context, are synchronized with each other via the life check signals, so that registration devices 38 and 40 receive the same information with respect to point in time and duration of data transmission interference on digital network 16.

Registration device 38 is connected to control device 32, so that it is able to control data transmission, based on stored status data regarding data transmission interference. In the same manner, registration device 40 is connected to a control device 42 of recording device 18, this control device 42 controlling the recording by data memory or data memories 30. Control device 42 of recording device 18 is also connected to an evaluation device 44, via which the recorded data are able to be evaluated.

The method according to the present invention may be implemented as follows:

The data are stored at the data source, such as capturing device 12, independently of recording device 18, that is, this data recording at the data source takes place in a manner independent of digital network 16, and therewith independent of possible data transmission interference on digital network 16. The storage capacity of data memory 26, in this context, is selected in such a way that, at a certain data transmission rate to digital network 16 and on digital network 16, videodata and/or audio data are recorded at the data source for a prespecified duration. The prespecified duration, in this context, is adjusted to the maximum expected duration of the data transmission interference. If, for example, the data transmission for the video/audio data flow is 1 megabit per second, and if a maximum interference time of 8 hours is expected, the storage capacity of data memory 26 is at least 4 gigabytes, with a safety factor being taken into consideration.

This storage capacity may be doubled, in order to make possible the input of data (for protection against data losses during a possible network interference) during the read-out of buffered data from data memory 26.

FIGS. 2a and 2b schematically show the recording procedure during interference 46 of data transmission on digital network 16. During time period T of the interference (FIG. 2b), recording device 18 receives no captured data, so that a data gap 48 is present in the recording of data memory 30. Interference 46 is shown in exemplary form, and is intended to symbolize every possible interference source in the data transmission. The interference may also be present, for instance, in the region of the interconnection of data memory 26, or, for example, in network 16.

According to the present invention, the data recording at the data source by data memory 26 occurs independently of recording device 18, and without a gap, since the data recording takes place at the data source. This is depicted in FIG. 2b. The data that have accrued during the interference of the data transmission on digital network 16 are thus stored in data memory 26, so that with this, data gap 48 in data memory 30 of recording device 18 is able to be filled in after the end of the transmission interference.

Detection devices 34, 36 of capturing device 12 and recording device 18, respectively, detect interference 46, in this context, via the exchange of the life check signals, and the corresponding status data are stored in registration devices 38, 40, so that data gap 48 is able to be categorized with regard to time, both at capturing device 12 and recording device 18, that is, the time of the beginning of data gap 48 and the time of ending of data gap 48 (and therewith also the length in time of data gap 48) are known.

A freedom from interference of the transmission on digital network 16 is detected via the exchange of the life check signals by test devices 34, 36. This state is depicted following interference state 46 in FIG. 3a. At the beginning of the detection of the freedom from interference, data gap 48 is contained in the data recording of recording device 18, while the missing data in the data recording at the data source are present, that is, included in data memory 26 (FIG. 3b). The corresponding data 50 are now read out from data memory 26 by control device 32, in the light of the input into registration device 38, and are transmitted on digital network 16 (FIG. 3c). Control device 42 of recording device 18 places these data in storage area of data memory 30, which corresponds to data gap 48 (FIG. 3c). Thereby, the data recording at recording device 18 is completed, that is, complete data are present here without gaps, and thus a complete data flow is also recorded there. This is depicted in FIG. 3d.

Consequently, via the data recording at the data source, that is, allocated to capturing device 12, data gaps 48 at recording device 18 due to interference in data transmission on digital network 16, may be "repaired", that is, the missing data are read out from data memory 26 and input into data memory 30. In this context, this procedure takes place via control devices 32 and 42, e.g., automatically, so that, at least delayed in time, there is made possible a complete data record, with respect to the data generated by digital camera 20, at recording device 18. According to the present invention, a fault-tolerant, network-based video/audio data recording method is made available.

It may be provided that recording device 18 records interference in the data transmission on digital network 16, and, based on the detection of interference, initiates further steps, and especially requests data from capturing device 12. This data request is schematically indicated in FIG. 1 by arrow 54; recording device 18 sends corresponding signals via digital network 16 specifically to a capturing device, such as capturing device 12, or to all capturing devices 12, 14, in order to induce these devices to send the data missing at recording device 18.

Thus, after the establishment of transmission interference, as recording server, recording device 18 itself initiates the necessary steps for acquiring the missing data.

It may be provided alternatively, or in combination, that capturing device 12 is developed to be "intelligent", and is able to detect interference in digital network 16. After the detection of such an interference 16, capturing device 12 then itself initiates the steps required for making available the missing data to recording device 18. This automatic making available of data is indicated in FIG. 1 by arrows 56 for capturing device 12 and 58 for capturing device 14.

In this context, capturing device 12 (or capturing device 14) then sends at the same time current data for recording to recording device 18 and stored data for filling up a data gap to recording device 18. Thus, two kinds of data are transmitted, namely current data and repair data. The data packets may, for instance, be distinguished by appropriate characterizations, such as timing marks.

One example approach in which the capturing device or the capturing devices detect interference and then make available repair data independently of recording device 18, is especially sensible if, for instance, there is a plurality of cameras 20, 22.

The data made available by a capturing device 12 have an inherent timing mark. Upon receipt of such data, recording device 18 is able to use the repair data in the right location, based on the timing mark, especially via its control device 42.

Figure 6:
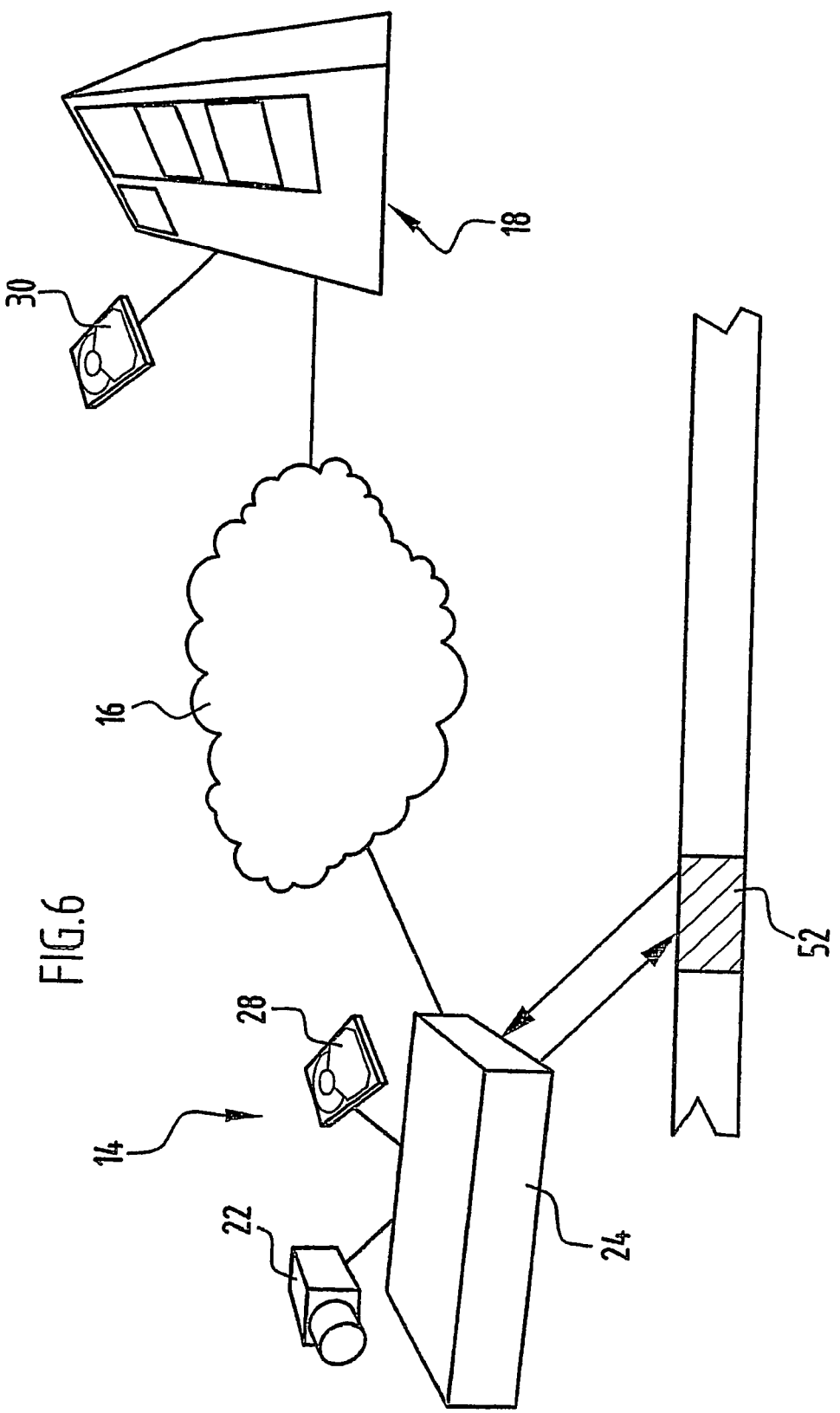
FIG. 6 shows a schematic representation of an exemplary embodiment of a memory management according to the present invention.

The capacity of data memory 26 at capturing device 12 or data memory 28 at capturing device 14 is usually limited, if for no other reason than space. However, using the recording method according to the present invention, it is possible to increase the memory capacity at the data source by forming a virtual data memory. This is shown schematically in FIG. 6 in the light of capturing device 14.

Data memory 28 of capturing device 14 has a certain capacity 52. Data memory or memories 30 of recording device 18 has/have a very much larger capacity. Now, it is provided, according to the present invention, that data memory 28 and data memory 30 are connected. This is described, for example, in the light of a connection via digital network 16. Thereby, the reading out of data from data memory 28 for transmission of these data on digital network 16 may be logically interconnected to the input of new data into data memory 28. Because of this interconnection, a virtual data memory is made available to video server 24 (or, in the case of capturing device 12, to digital camera 20), whose capacity is greater than the physical capacity of data memory 28 (or 26).

Thereby, a data memory having virtual "infinite" capacity is allocated to capturing device 12 or 14, this virtual data memory at least having a capacity that is very much greater than the capacity of data memory 28 of capturing device 14.

These data are copied by reading out the data from data memory 28 for transmission on digital network 16; that is, the same data set is present once in data memory 28, and secondly, it is transmitted over digital network 16 and then stored in data memory 30. After the successful recording of these data by recording device 18, and the checking of the data for intactness, the transmitted data may then deleted from data memory 28.

The input of data into data memory 28 takes place continuously, in this context, based on the supply of new data, for instance, by the analog camera. The read-out procedure of the data from data memory 28 for transmission of these data on digital network 16 to recording device 18 may, in this context, also take place continuously, and especially at the same speed as that of the input of the data.

It may also be provided that the data from data memory 28 be read out at time intervals in the form of data packets, and then transmitted on digital network 16. This read-out procedure is controlled, in this context, especially in that a certain capacity threshold is reached, such as a capacity threshold at or below 50% of the overall capacity of data memory 28. The read-out procedure (that is, the copying procedure) then takes place at a speed that is greater than the input speed into data memory 28.

It may be provided that current data are input into data memory 28, while older data are copied to digital network 16 for recording at recording device 18. The storage management of data memory 28 then takes place according to the FIFO principle (first in, first out).

This process of copying the data from data memory 28 for transmission on digital network 16 takes place, in this context, controlled by control device 32.

Control device 32 is in contact with control device 42 of recording device 18, in order to obtain a release, after receipt of transmitted data by recording device 18, if the data received by recording device 18 are intact. After such a release, the copied data may then be deleted from data memory 26.

Because of the method according to the present invention for recording video/audio data, the storage capacity of capturing device 14 (and of possible further capturing devices 12) may be greatly increased. It may thereby be ensured that data memory 28 does not reach its capacity limits at the data source.

The procedure of copying data between data memory 28 of capturing device 14 and data memory 30 of capturing device 18 takes place so to speak "invisibly" to capturing device 14, or rather transparently; only a smaller part of the data is actually, physically in data memory 28 of capturing device 14. A greater part of the data is transferred to an external location in data memory 30, the data included in data memory 30, however, being also able to be read out via capturing device 14.

If a user wants to read out data at capturing device 14, he cannot distinguish whether the data originate directly from data memory 28, that is, whether they are physically there, or were transferred to external storage in data memory 30, and first have to be retrieved from there.

Data memory 30 and recording device 18 are a central recording unit, with respect to capturing devices 12 and 14, which are able to be used commonly by a plurality of independent capturing devices, in order, via the development of a virtual data memory, to increase the storage capacity, likewise virtual, at the individual capturing devices.

As described above, data memory 30 is situated at a recording device 18, which is connected via digital network 16 to capturing devices 12 and 14. However, it may also be provided that the connection does not take place via a digital network but, for example, by direct wiring.

If the recording method according to the present invention is implemented, one may then tolerate temporary interferences in the data transmission on digital network 16 without loss of data at recording device 18. The storage capacity, e.g., the hard disk capacity of data memory 26, may be adjusted to the transmission rate and the maximum interference duration expected.

The "actual" data recording for storage and evaluation of the data takes place at recording device 18, which has a considerably greater storage capacity. Because of the data buffering at the data source, data gaps based on interference in the data transmission may be filled in.

Because of the method according to the present invention, an interference in the data transmission on digital network 16, during data copying onto digital network 16, may also be intercepted.

Figure 7:
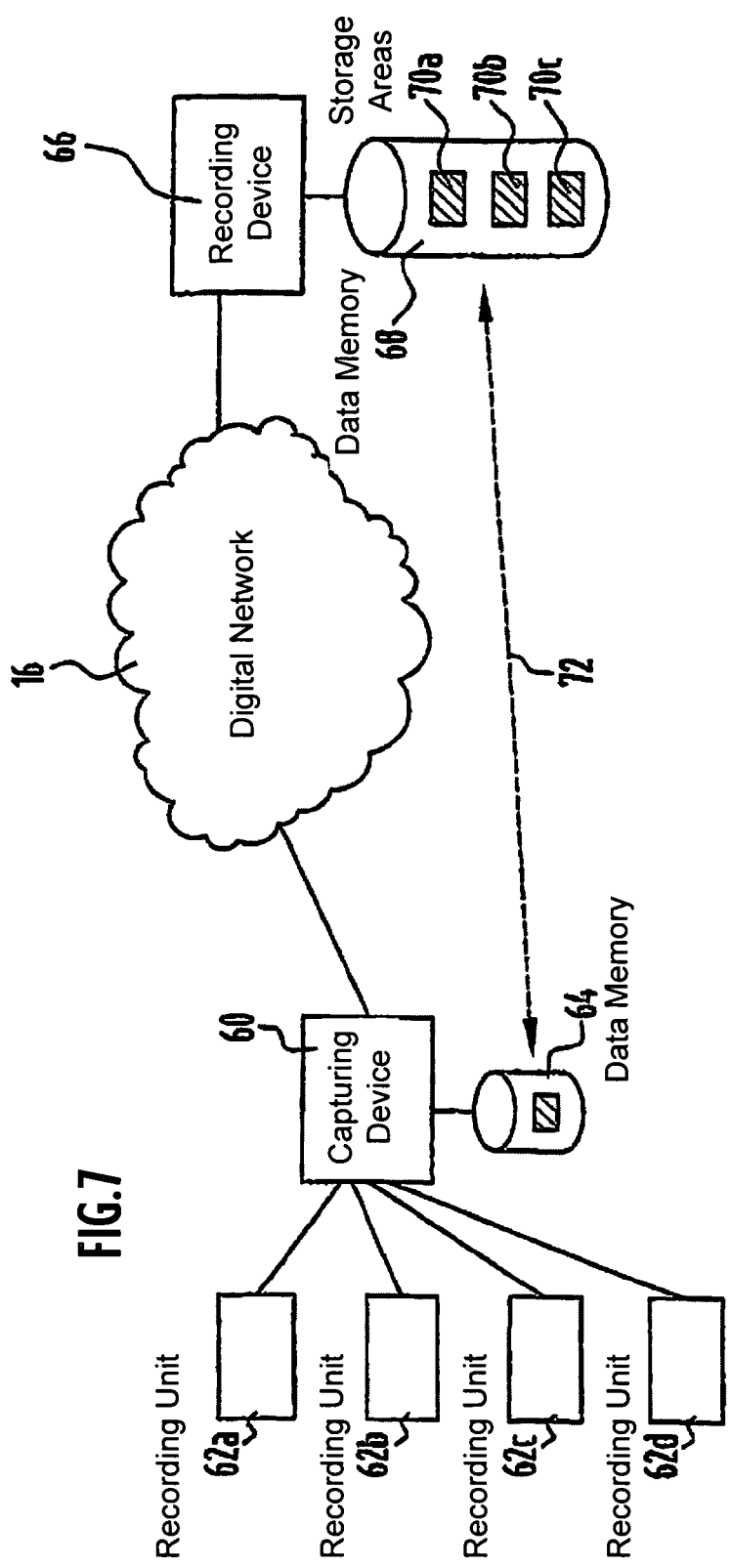
FIG. 7 shows a schematic representation of an additional exemplary embodiment of an NVR system.

It may be provided that, as shown schematically in FIG. 7, a capturing device 60, which includes, for example, a video server, has a plurality of recording units 62a, 62b, 62c, 62d, etc. The capturing devices may be cameras. These recording units 62a, 62b, 62c, 62d monitor different regions, there possibly being present different requirements with respect to the duration of the recording. The requirements may be based on practical considerations or also on legal regulations. Thus, for example, there may be regulations that, in the case of certain localities, the data for emergency exits have to be kept for 90 days. Therefore, for differently observed regions (corresponding to the different capturing units and especially cameras 62a, 62b, 62c, 62d) different recording durations may be provided.

This is explained in the following discussion in the light of an example, in which the region monitored by capturing unit 62d is monitored at a 12-hour recording duration, the region allocated to capturing unit 62c at a 24-hour recording duration, the region allocated to capturing unit 62b at a 10-day recording duration, and the region allocated to capturing unit 62a at a 90-day recording duration.

Figure 8:
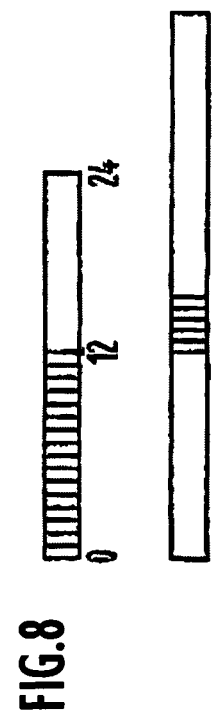
FIG. 8 shows schematically the memory content at a capturing device in the case of an NVR system shown in FIG. 7.

A data memory 64 of capturing device 60 has a certain recording capacity, such as 24 hours (indicated in FIG. 8 by the upper bar).

A recording device 66 having a data memory 68 which has a considerably greater capacity than data memory 64, is used as a recording server for the data made available by capturing device 60 via digital network 16. A virtual data memory, as described above, is formed for capturing device 60 by this data memory 68, whereby the capacity limitations of data memory 64 may be increased.

Data memory 68 has reserved storage area 70a, 70b, 70c, these storage areas being allocated to the corresponding recording durations. For example, storage area 70a is allocated to capturing unit 62a, storage area 70b is allocated to capturing unit 62b and storage area 70c is allocated to capturing unit 62c, along with the corresponding recording times.

If a certain capacity level in data memory 64 is exceeded, that is, when, for example, (as indicated in FIG. 8) 50% of storage capacity has been reached, then data are "transferred to an external location", by transmitting them to recording device 66 and storing them in its data memory 68. The virtual memory formed for capturing device 60 is indicated by connection 72.

The data of capturing unit 62d do not have to be transmitted to recording device 66, since, in the case of the numerical example mentioned above, data memory 64 has a great enough capturing capacity, i.e., in data memory 64 data having the required length in time for unit 62d are always stored.

Data which originate with capturing unit 62c are transmitted to recording device 66 and are stored there in storage area 70b having the required recording duration (24 hours retroactively from the current point in time). The same applies to the storage of data that originate with capturing units 62 and 62b.

Even if the storage capacity of data memory 64 is not sufficient for the data covering a longer time period, the recording of these data over the required time period is ensured by the virtual storage concept, that is, the data are secured in data memory 68. However, a certain data volume is always held "in situ", which means in data memory 64 of capturing device 60.

One thereby obtains a security against failures, especially in the transmission of data on digital network 16. At the same time, however, the possibility of storing large data volumes is ensured, namely in data memory 68 of recording device 66.

In this context, it is favorable if the storage duration that is to be allocated to a capturing unit 62a, 62b, etc, is adjustable and, in this context, adjustable independent of the specific storage location in data memory 68.

It may be provided in principle that the transmission rate for repair data, which are made available to recording device 18 or 66, is greater than the transmission rate for current data.

Current data are those data that are transmitted to recording device 18 or 66 without interference in digital network 16. Thereby, it is ensured that data gaps at recording device 18 or 66 are quickly filled in.

It is also possible that the transmission rate for repair data could be less than the transmission rate for current data. Thereby one may ensure, especially at a prespecified bandwidth, that the influencing of the transmission of current data is minimized by the additional transmission of repair data. If, for example, a large volume of repair data has accrued, then it is favorable if a low transmission rate for repair data to recording device 18 or 66 is selected.

It may be provided that the transmission rate for repair data is adjustable. In this context, the setting may take place, depending on the application, at the data source or at recording device 18 or 66 (if the latter requests repair data). In that way, one may achieve a flexible adaptation to the actual situation.

It is also possible to position the repair data that are to be transmitted in a queue, in a graduated time sequence. The transmission rate for the repair data may then, for example, be selected as a function of the length of the queue. It is also alternatively or additionally possible to incorporate the repair data in the queue according to its priority, which is determined, for instance, by the corresponding timing marks, and then perform the transmission to recording device 18 or 66.

What is claimed is:

1. A method for recording at least one of video data and audio data generated by a capturing device having an associated data memory, comprising:
   connecting, via a digital network, the data memory of the capturing device to at least one recording device that has a greater storage capacity than the data memory of the capturing device, wherein the at least one recording device is physically remote from the capturing device;
   exchanging data between the data memory of the capturing device and the at least one recording device, whereby a virtual data memory is formed for access by the capturing device by operational connection between the data memory of the capturing device and the at least one recording device, the virtual data memory representing a combined data memory capacity formed by the data memory of the capturing device and the at least one recording device;
   at the capturing device, receiving a request from a user to access the exchanged data, wherein the request does not differentiate between data stored on the data memory of the capturing device and data stored on the virtual data memory; and
   responsive to the request, retrieving the exchanged data stored on the virtual data memory, the retrieving occurring at the capturing device.

2. The method as recited in claim 1, wherein the data memory of the capturing device is a local data memory.

3. The method as recited in claim 2, wherein the at least one recording device forms a central data memory.

4. The method as recited in claim 3, wherein the capturing device is interconnected with a digital communication network.

5. The method as recited in claim 4, wherein the at least one recording device is interconnected with the digital network.

6. The method as recited in claim 5, wherein reading-out of data from the data memory of the capturing device for transmission to the at least one recording device is operationally dependent on input of new data into the data memory of the capturing device.

7. The method as recited in claim 6, wherein the new data input into the data memory of the capturing device are more current in time than the data read out from the data memory of the capturing device.

8. The method as recited in claim 7, wherein the data transmitted from the data memory of the capturing device are received by the at least one recording device and stored.

9. The method as recited in claim 6, wherein the reading-out of data from the data memory of the capturing device for transmission includes copying of the data from the data memory of the capturing device.

10. The method as recited in claim 7, wherein during the input of new data into the data memory of the capturing device, older data are read out from the data memory of the capturing device for transmission.

11. The method as recited in claim 10, wherein the new data are input into the data memory of the capturing device at a substantially the same rate as a rate of reading out the data from the data memory of the capturing device.

12. The method as recited in claim 11, wherein the data are continually read out from the data memory of the capturing device.

13. The method as recited in claim 10, wherein the data are read out from the data memory of the capturing device at specified time intervals.

14. The method as recited in claim 13, wherein the data are read out from the data memory of the capturing device at a rate higher rate than a rate of input of the new data into the data memory of the capturing device.

15. The method as recited in claim 13, wherein the data are read out from the data memory of the capturing device when a specified threshold is reached.

16. The method as recited in claim 15, wherein the specified threshold is determined by the storage capacity of the data memory of the capturing device.

17. The method as recited in claim 16, wherein storing of data in the data memory of the capturing device provides a buffer function for data transmission to the at least one recording device.

18. The method as recited in claim 17, wherein the data read out from the data memory of the capturing device and successfully transmitted to the at least one recording device are deleted from the data memory of the capturing device after the successful transmission.

19. The method as recited in claim 18, wherein the at least one recording device has a plurality of different storage areas that correspond to a plurality of different data recording time durations.

20. The method as recited in claim 19, wherein the plurality of different storage areas are each reserved for a specified data recording time duration.

21. The method as recited in claim 19, wherein the plurality of different storage areas are allocated to corresponding one of: a) a plurality of different capturing devices; and b) a plurality of different capturing units of a capturing device.

22. The method as recited in claim 19, wherein the plurality of different storage areas are allocated to different specified data recording time durations.

23. The method as recited in claim 19, wherein the data memory of the capturing device has a data storage capacity corresponding to a specified time duration of data accrual.

24. The method as recited in claim 23, wherein data are transmitted from the data memory of the capturing device to the at least one recording device when a specified time limit threshold for data accrual in the data memory of the capturing device is exceeded.

25. The method as recited in claim 17, wherein the at least one recording device that receives the transmitted data from the data memory of the capturing device checks the transmitted data for intactness.

26. The method as recited in claim 25, wherein, if the data from the data memory of the capturing device have been transmitted to the at least one recording device intact, the at least one recording device sends a notification of the intactness of the transmitted data to the capturing device.

27. The method as recited in claim 26, wherein, upon receipt of the notification of the intactness of the transmitted data, the capturing device deletes the transmitted data from the data memory of the capturing device.

28. A data capturing device for at least one of video and audio data, comprising:
  a data memory for storing at least one of video and audio data;
  a control device for the data memory; and
  an interface unit for facilitating communication via a digital network with at least one central recording device which is physically remote from the data capturing device, wherein data are transmitted via the interface unit and the digital network to the at least one central recording device;
  wherein reading-out of data from the data memory for transmission to the at least one central recording device is operationally dependent on input of new data into the data memory, and whereby a virtual data memory is formed for access by the capturing device by operational connection between the data memory and the at least one central recording device via the digital network, the virtual data memory representing a combined data memory capacity formed by the data memory of the capturing device and the at least one central recording device, the interface unit being configured to retrieve the transmitted data from the at least one central recording device in response to a request from a user to access the transmitted data, wherein the request does not differentiate between data stored on the data memory and data stored on the at least one central recording device.

29. The data capturing device as recited in claim 28, wherein the reading-out of data from the data memory for transmission includes copying of data from the data memory by the control device.

30. The data capturing device as recited in claim 29, wherein data are continually read out from the data memory by the control device for transmission.

31. The data capturing device as recited in claim 29, wherein data are read out at specified time intervals from the data memory by the control device for transmission.

32. The data capturing device as recited in claim 29, wherein, if the data from the data memory have been transmitted to the at least one central recording device intact, the at least one central recording device sends a notification of the intactness of the transmitted data to the control device.

33. The data capturing device as recited in claim 32, wherein, upon receipt of the notification of the intactness of the transmitted data, the control device deletes the transmitted data from the data memory.

34. The data capturing device as recited in claim 33, further comprising:
  at least one of a camera for generating the video data and a microphone for generating the audio data.

35. The data capturing device as recited in claim 33, wherein the interface unit is for interfacing a digital network, whereby data are transmitted on the digital network to the at least one central recording device that is interconnected with the digital network.

36. A recording system for capturing and storing at least one of video and audio data, comprising:
  at least one central recording device; and
  a data capturing device located physically remote from the at least one central recording device, the data capturing device including:
    a data memory for storing at least one of video and audio data:
    a control device for the data memory; and
    an interface unit for facilitating communication with at the least one central recording device via a digital network, wherein data are transmitted via the interface unit and the digital network to the at least one central recording device;
  wherein reading-out of data from the data memory of the data capturing device for transmission to the at least one central recording device is operationally dependent on input of new data into the data memory of the data capturing device, and whereby a virtual data memory is formed for access by the capturing device by operational connection between the data memory and the at least one central recording device via the digital network, the virtual data memory representing a combined data memory capacity formed by the data memory of the data capturing device and the at least one central recording device;
  wherein, if the data from the data memory of the data capturing device have been transmitted to the at least one central recording device intact, the at least one central recording device sends a notification of the intactness of the transmitted data to the data capturing device, and wherein, upon receipt of the notification of the intactness of the transmitted data, the data capturing device deletes the transmitted data from the data memory, the interface unit being configured to retrieve the transmitted data from the at least one central recording device in response to a request from a user to access the transmitted data, wherein the request does not differentiate between data stored on the data memory and data stored on the at least one central recording device.

* * * * *